US008331562B2

(12) United States Patent  
Nishigai et al.

(10) Patent No.: US 8,331,562 B2
(45) Date of Patent: Dec. 11, 2012

(54) IMAGE FORMING APPARATUS, IMAGE FORMING METHOD AND, COMPUTER READABLE MEDIUM AND COMPUTER SIGNAL

(75) Inventors: Hidefumi Nishigai, Kanagawa (JP); Katsuhiko Ono, Kanagawa (JP); Masato Tsuji, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1131 days.

(21) Appl. No.: 11/723,863

(22) Filed: Mar. 22, 2007

(65) Prior Publication Data

US 2008/0044021 A1    Feb. 21, 2008

(30) Foreign Application Priority Data

Jun. 28, 2006   (JP) ................ P2006-177720

(51) Int. Cl.
*H04N 1/44*   (2006.01)
(52) U.S. Cl. ................... 380/243; 380/253
(58) Field of Classification Search .......... 380/253, 380/243, 28, 30, 37
See application file for complete search history.

(56) References Cited

U.S. PATENT DOCUMENTS

| 2001/0029513 | A1* | 10/2001 | Kuwano et al. ......... 707/522 |
| 2001/0054156 | A1* | 12/2001 | Teshigawara ........... 713/194 |
| 2003/0063749 | A1* | 4/2003 | Revel et al. ............ 380/270 |
| 2004/0018030 | A1* | 1/2004 | Shiraki et al. .......... 399/227 |
| 2004/0170274 | A1* | 9/2004 | Machida et al. ........ 380/46 |

FOREIGN PATENT DOCUMENTS

| JP | 4-294682 | 10/1992 |
| JP | 4-332260 | 11/1992 |
| JP | 8-9140 | 1/1996 |
| JP | 9-121282 | 5/1997 |
| JP | 9-135345 | 5/1997 |
| JP | 9-135361 | 5/1997 |

OTHER PUBLICATIONS

Teodosio et al., Salient Stills, Feb. 2005, ACM, vol. 1, No. 1.*

* cited by examiner

*Primary Examiner* — Brandon Hoffman
*Assistant Examiner* — Samuel Ambaye
(74) *Attorney, Agent, or Firm* — Morgan, Lewis & Bockius LLP

(57) ABSTRACT

An image forming apparatus comprises: an output part that outputs variable information varying in a time-dependent manner in the image forming apparatus; a first encrypt part that encrypts the variable information outputted from the output part using a first encrypt key read out from a memory; a second encrypt key create part that creates a second encrypt key according to the variable information outputted from the output part; a second encrypt part that encrypts inherent information for specifying the image forming apparatus using the second encrypt key created by the second encrypt key create part; a generate part that generates code data according to the variable information encrypted in the first encrypt part and the inherent information encrypted in the second encrypt part; and an image form part that forms on a recording member a code image based on the code data generated in the generate part.

7 Claims, 9 Drawing Sheets

FIG. 9A

| AREA | A | B | C | D | E |
|---|---|---|---|---|---|
| 1 | D01 | D02 | D03 | D04 | D05 |
| 2 | D06 | D07 | D08 | D09 | D10 |
| 3 | D11 | D12 | D13 | D14 | D15 |
| 4 | 06 (YEAR) | 05 (MONTH) | 31 (DAY) | 00 (HOUR) | 35 (MINUTE) |

M2 = rows 1-3; M1 = row 4; M = all

FIG. 9B

| AREA | A | B | C | D | E |
|---|---|---|---|---|---|
| 1 | D15 | D01 | D02 | D03 | D04 |
| 2 | D05 | D06 | D07 | D08 | D09 |
| 3 | D10 | D11 | D12 | D13 | D14 |
| 4 | 06 (YEAR) | 05 (MONTH) | 31 (DAY) | 01 (HOUR) | 35 (MINUTE) |

M2 = rows 1-3; M1 = row 4; M = all ated Art

In the related art, in an image forming apparatus for processing a full color image signal electrically to obtain an output image signal, there is proposed an image forming apparatus which is deigned to add a specific pattern (code image) to the output image signal.

SUMMARY

An image forming apparatus to which the invention is applied comprises: an output part that outputs variable information varying in a time-dependent manner in the image forming apparatus; a first encrypt part that encrypts the variable information outputted from the output part using a first encrypt key read out from a memory; a second encrypt key create part that creates a second encrypt key according to the variable information outputted from the output part; a second encrypt part that encrypts inherent information for specifying the image forming apparatus using the second encrypt key created by the second encrypt key create part; a generate part that generates code data according to the variable information encrypted in the first encrypt part and the inherent information encrypted in the second encrypt part; and an image form part that forms on a recording member a code image based on the code data generated in the generate part

BRIEF DESCRIPTION OF THE DRAWINGS

Exemplary embodiments of the present invention will be described in detail based on the following figure, wherein:

FIGS. 9A and 9B are explanatory views of an example of a code data creating operation to be executed in the exemplary embodiment 3.

DETAILED DESCRIPTION

Now, description will be given below in detail of an exemplary embodiment for enforcing the invention with reference to the accompanying drawings.

Exemplary Embodiment 1

Figure 1:
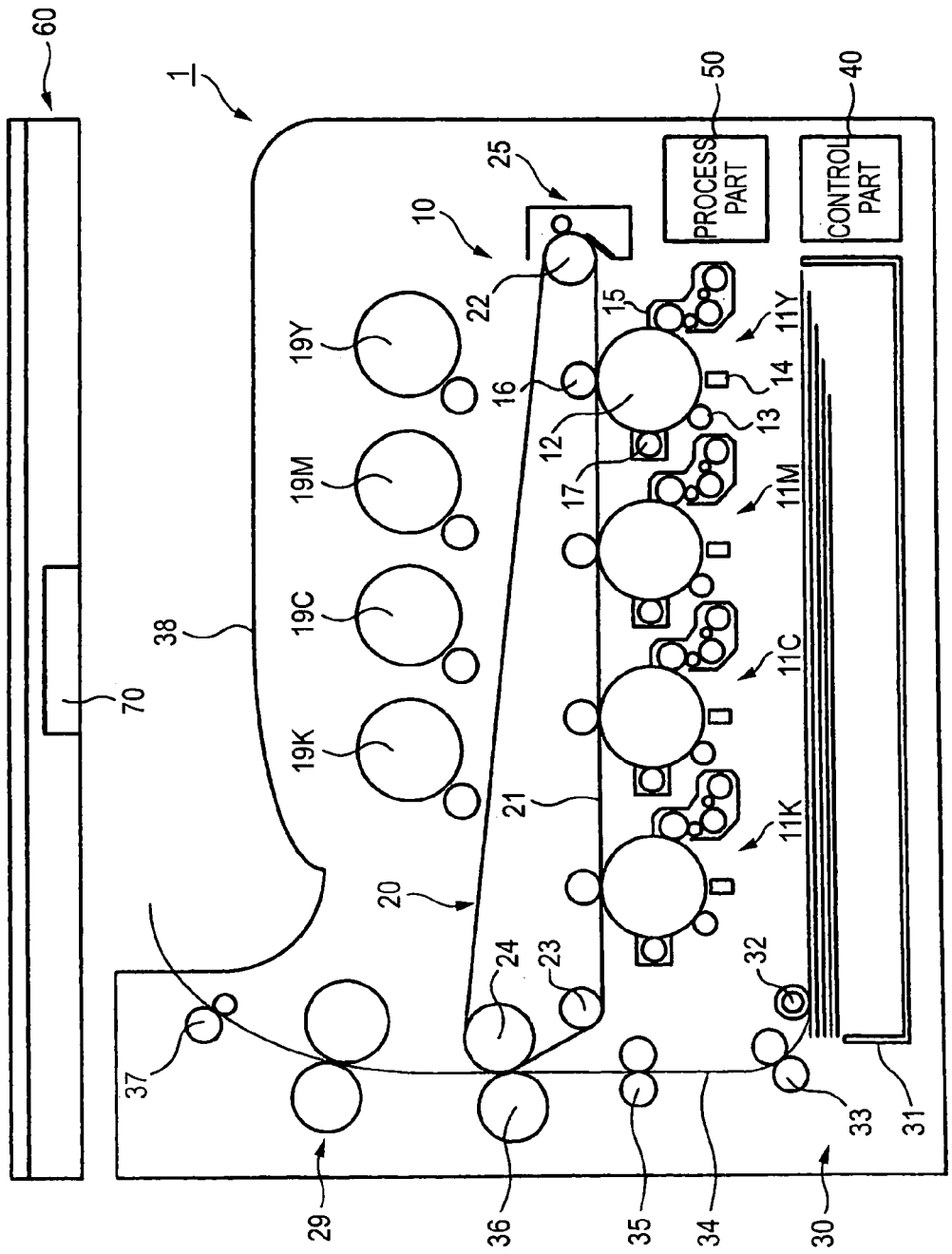
FIG. 1 is a view of an example of the whole structure of an image forming apparatus to which the exemplary embodiment 1 of the invention is applied.

FIG. 1 is a schematic view of the whole structure of an image forming apparatus to which the present exemplary embodiment is applied. The present image forming apparatus includes a printer part 1 and a scanner part 60. The printer part 1 includes an image formation process system 10, a sheet deliver system 30, a control part 40, and a process part 50. Of these composing parts, the image formation process part 10 forms an image based on image data on colors generated in the process part 50. Also, the sheet deliver system 30 delivers a recording sheet as a recording member in response to the operation of the image formation process system 10. The control part 40 controls the operations of the printer part 1 and scanner part 60. The process part 50 is connected to the scanner part 60 and a client which is composed of a PC (Personal Computer) (not shown) or the like, enforces a processing on print data received, converts the print data to image data on colors used in the image formation process system 10, and outputs the image data.

By the way, FIG. 1 is a view obtained when the image forming apparatus is viewed from this side and, on the front side of the scanner part 60, there is provided a UI (User Interface) 70 which is used to accept an operation instruction from a user and notify the user of information.

The image formation process system 10 includes not only four image forming units, that is, a yellow image forming unit (Y unit) 11Y, a magenta image forming unit (M unit) 11M, a cyan image forming unit (C unit) 11C and a black image forming unit (K unit) 11K, but also a transfer unit 20. The Y unit 11Y, M unit 11M, C unit 11C and K unit 11K are arranged parallel to each other at given intervals in the horizontal direction.

The image forming units 11 (11Y, 11M, 11C and 11K) functioning as an image forming part respectively include sensitive drums 12 which are disposed in a rotatable manner. Also, in the periphery of each sensitive drum 12, there are sequentially disposed a charger 13, an exposure device 14, a developing device 15, a primary transfer roller 16, a drum cleaner 17 and the like. Of these peripheral devices, the charger 13 charges the sensitive drum 12 to a given potential. The exposure device 14 selectively radiates an optical beam onto the sensitive drum 12 charged to a given potential to thereby form an electrostatic latent image. The developing device 15 stores therein color component toner corresponding to the units (for example, for the Y unit, yellow toner), and develops the electrostatic latent image on the sensitive drum 12 using such toner. The primary transfer roller 16 is driven by a primary transfer bias applied thereto to primarily transfer the toner image formed on the sensitive drum 12 to an intermediate transfer belt 21. The drum cleaner 17 removes residual substances (such as the toner) left on the sensitive drum 12 after the primary transfer.

Here, according to the present exemplary embodiment, the exposure device 14 is composed of, for example, a LED print head in which a large number of LEDs (Light Emitting Diodes) are arranged in the main scanning direction. As the exposure device 14, there can also be used a scan-type exposure device which uses an LD (Laser Diode), a polygon mirror or the like.

Also, upwardly of the respective image forming units 11 (11Y, 11M, 11C, and 11K), there are disposed four toner cartridges 19 (19Y, 19M, 19C and 19K) with the intermediate transfer belt 21 between them. The toner cartridges 19 (19Y, 19M, 19C and 19K) respectively supply the corresponding color toner to their associated developing devices 15 respectively disposed in the image forming units 11 (11Y, 11M, 11C, and 11K).

The transfer unit 20 includes the intermediate transfer belt 21, a drive roller 22, a tension roller 23, a backup roller 24, and a belt cleaner 25. Of these composing parts, the intermediate transfer belt 21 is rotatably extended over and supported on the drive roller 22, tension roller 23 and backup roller 24. The drive roller 22 not only carries the intermediate transfer belt 21 thereon but also drives and rotates the intermediate transfer belt 21. The tension roller 23 not only carries the intermediate transfer belt 21 thereon to thereby apply a given amount of tension to the intermediate transfer belt 21 but also can be rotated following the intermediate transfer belt 21 driven by the drive roller 22. The backup roller 24 not only carries the intermediate transfer belt 21 thereon but also functions as the composing part of a secondary transfer device (which will be discussed later). The belt cleaner 25 is mounted on a portion which is opposed to the drive roller 25 with the intermediate transfer belt 21 between them, and removes residual substances (such as the tone) left on the intermediate transfer belt 21 after the secondary transfer.

The sheet deliver system 30 includes a sheet feed tray 31, a take-out roller 32, a field roller 33, a delivery passage 34, a resist roller 35, a secondary transfer roller 36, a discharge roller 37, and a discharge tray 38. Also, between the secondary transfer roller 36 and discharge roller 37, there is interposed a fixing device 29 which heats and fixes a toner image secondarily transferred to a sheet. In the sheet feed tray 31, there are piled up sheets on which an image can be formed. The take-out roller 32 takes out the sheets piled up in the sheet feed tray 31 and supplies them. The field roller 33 separates the sheets one by one taken out by the take-out roller 32 and then delivers them separately to the delivery passage 34. The resist roller 35 stops once the sheets delivered along the delivery passage 34 and then delivers them toward a secondary transfer position at a proper timing. The secondary transfer roller 36 cooperates together with the backup roller 24 in forming a secondary transfer part, and secondarily transfers an image existing on the intermediate transfer belt 21 to the sheets delivered. The discharge roller 37 discharges the sheets, on which the image has been fixed by the fixing device 29, out of the image forming apparatus. The discharge tray 38 is disposed on the upper side of the printer part 1; and, the recorded sheets discharged by the discharge roller 37 are piled up on the discharge tray 38.

On the other hand, the scanner part 60 reads the image of a manuscript placed on a platen glass or the image of a manuscript being delivered on the platen glass using a CCD image sensor (not shown) or the like. According to the present exemplary embodiment, the scanner part 60 is structured such that it is able to read the image formed on the manuscript in full color.

Figure 2:
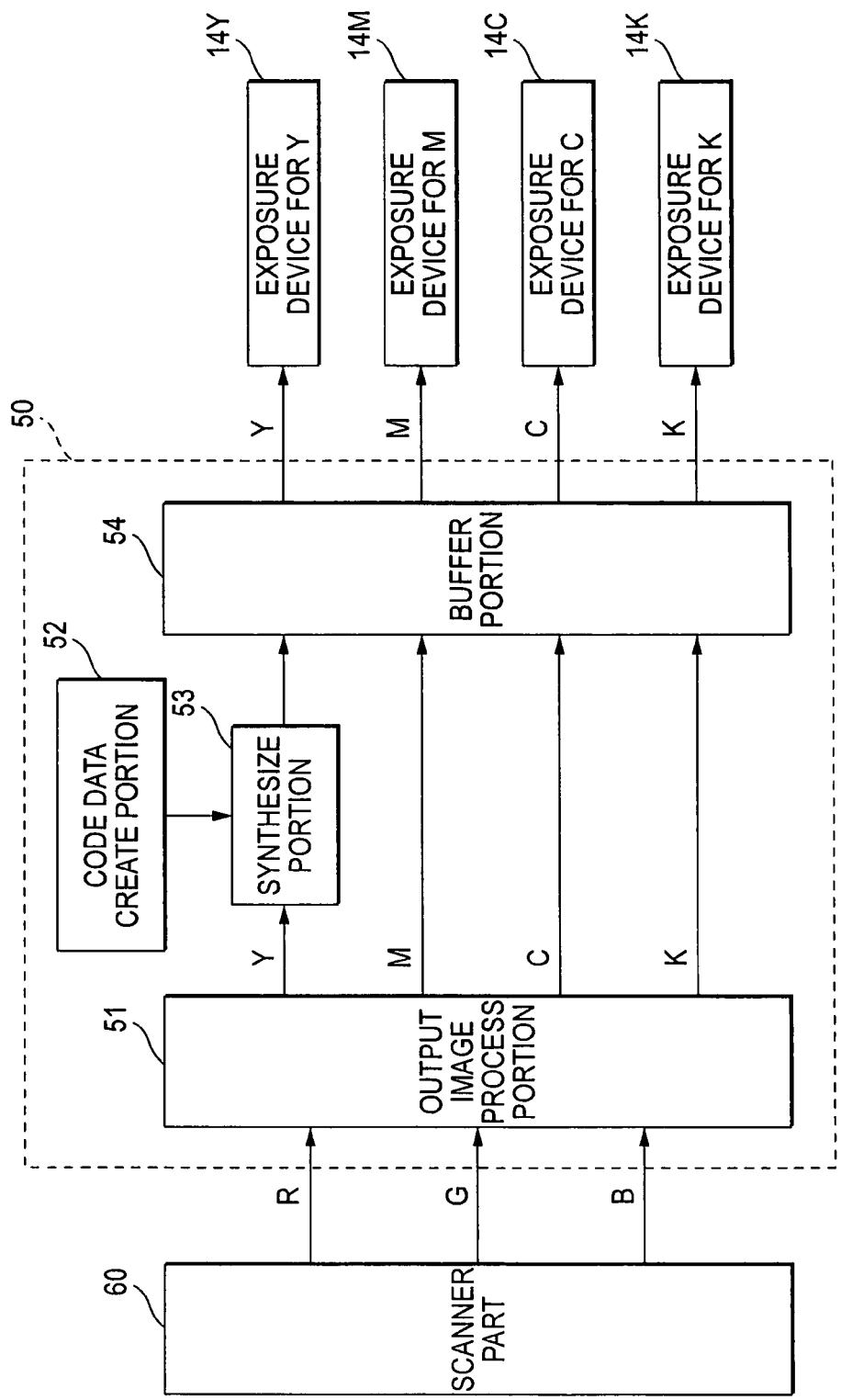
FIG. 2 is a function block diagram of a process portion provided in a printer part.

Now, FIG. 2 is a block diagram of the structure of the process part 50 disposed in the printer part 1. The process part 50 includes an output image process portion 51, a code data create portion 52, a synthesize portion 53, and a buffer portion 54.

The output image process portion 51 enforces a given image processing on read data inputted from, for example, the scanner part 60, and outputs the processed data as the image data. In this exemplary embodiment, the color read data on red (R), green (G) and blue (B) inputted from the scanner part 60 are color converted by the output image process portion 51, whereby these data are outputted as the full color image data of yellow (Y), magenta (M), cyan (C) and black (K).

The code data create portion 52 creates code data in which the inherent information of the printer part 1 including the code of a department where the printer part 1 is placed, the installation place of the printer part 1, the name of the manufacturer of the printer part 1 and the like, and outputs the code data to the synthesize portion 53.

On the other hand, the synthesize portion 53 synthesizes, of the respective color image data outputted from the output image process portion 51, the yellow image data and the code data transmitted from the code data create portion 52, and outputs the thus synthesized data.

The buffer portion 54 stores temporarily therein the yellow image data inputted through the synthesize portion 53 from the output image process portion 51 and the image data of the respective colors, that is, magenta, cyan and black inputted directly from the output image process portion 51, and, at a given timing, outputs the image data to an exposure device 14Y for Y, an exposure device 14M for M, an exposure device 14C for C and an exposure device 14K for K, respectively. Therefore, in the M unit 11M, C unit 11C, and K unit 11K, there are formed the respective color toner images based on the reading results by the scanner part 60. On the other hand, in the Y unit 11Y, there is formed a yellow color toner image based on the reading results by the scanner part 60 and the code data transmitted from the synthesize portion 53.

Figure 3:
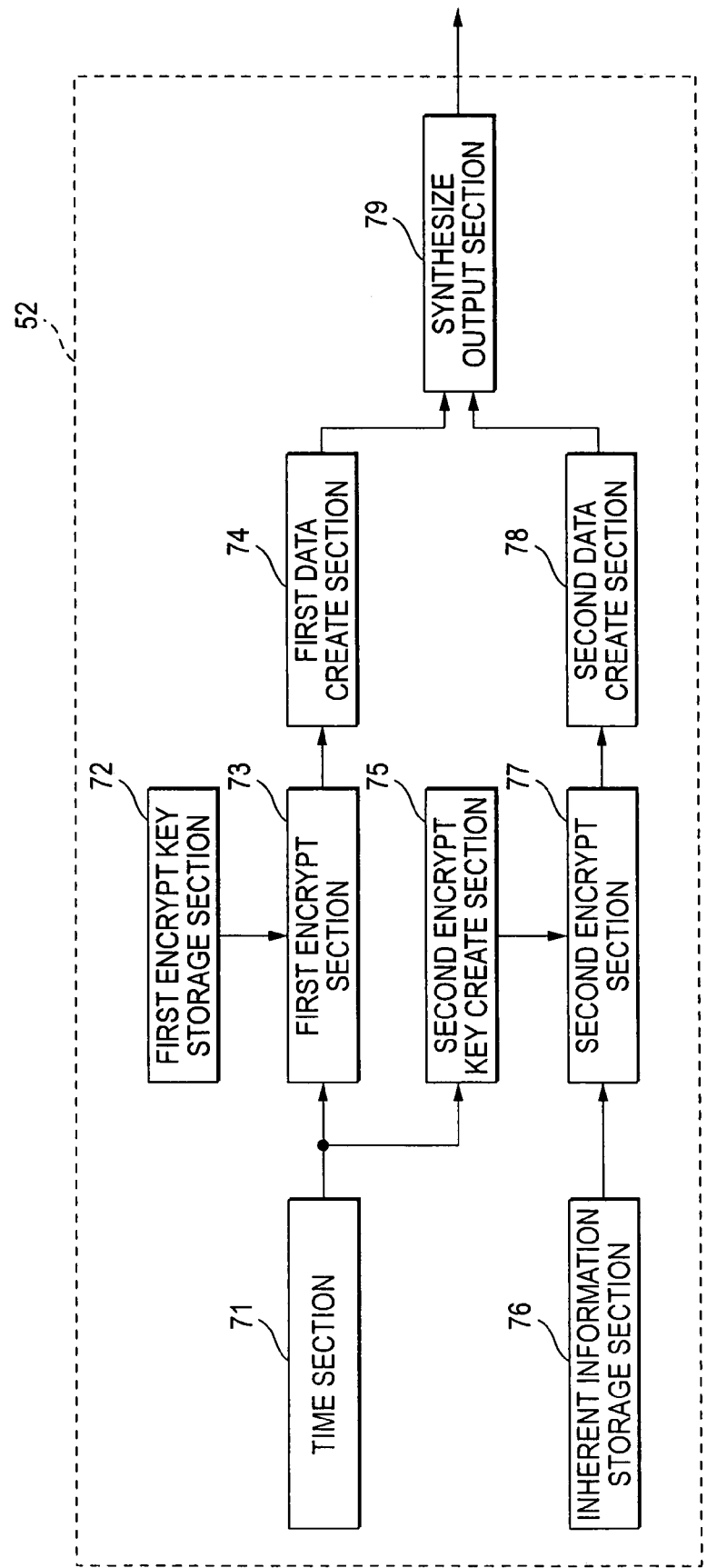
FIG. 3 is a function block diagram of a code data create section provided in the process portion.

Now, FIG. 3 is an explanatory block diagram of the details of the above-mentioned code data create portion 52. The code data create portion 52 includes a time section 71, a first encrypt key storage section 72, a first encrypt section 73, a first data create section 74, a second encrypt key create section 75, an inherent information storage section 76, a second encrypt section 77, a second data create section 78, and a synthesize output section 79.

The time section 71 incorporates a clock therein and outputs time information containing not only a year, a month and a date but also an hour and a minute. In the present exemplary embodiment, the time section 71 functions as an output section and thus the time section 71 outputs time information as the variable information.

The first encrypt key storage section 72 functions as a memory which stores therein information about an encrypt key (which is herein referred to as a first encrypt key) for encrypting the time information outputted from the time section 71.

The first encrypt section 73 encrypts the time information inputted from the time section 71 using the first encrypt key read out from the first encrypt key storage section 72.

The first data create section 74 creates first image data (data on the code image) based on the time information encrypted in the first encrypt section 73.

The second encrypt key create section 75 creates a new encrypt key (which is herein referred to as a second encrypt key) based on the time information inputted from the time section 71.

The inherent information storage section 76 is composed of, for example, an ROM (Read Only Memory) and stores therein the inherent information of the above-mentioned image forming apparatus (printer part 1) containing the department code, installation place, manufacturer's name and the like.

The second encrypt section 77 encrypts the inherent information of the printer part 1 read out from the inherent information storage section 76 using the second encrypt key created by the second encrypt key create section 75.

The second data create section 78 creates second image data (data on the code image) based on the time information encrypted in the second encrypt section 77. Therefore, according to the present exemplary embodiment, the above-mentioned first data create section 74 and the present second data create section 78 function as a generate part for generating the code data.

The synthesize output section 79 synthesizes the first image data created by the first data create section 74 and the second image data created by the second data create section 78 to thereby create the code data, and then outputs the code data to the synthesize portion 53 (see FIG. 2).

By the way, the first encrypt key itself stored in the first encrypt key storage section 72 and a generating expression for generating the second encrypt key used in the second encrypt key create section are not made open to the public but are kept secret.

Here, the code data create portion 52 can be made of a computer device. And, a program to be executed by the computer can be stored in a memory medium which is readably stored by the computer. As such memory medium, there are available a CD-ROM medium and the like. That is, the program can be read by the CD-ROM read device incorporated in the computer, and this program can be then stored into various memories such as the hard disk of the computer, whereby the program can be executed. Also, such program may also be supplied to a notebook computer or a portable terminal through a network by a program transmission device. As regards the minimum necessary condition of such program transmission device, the program transmission device may include only a memory for storing the program, and program transmitting means for supplying the program through a network.

Next, description will be given below of the image forming operation to be executed by the printer part 1.

When the read data is inputted, for example, from the scanner part 60 as the image forming operation is started, a processing is enforced on the read data by the process part 50. In the output image process portion 51 of the process part 50, based on the read data (RGB), there are created the image data (data for exposure) of the visible colors (YMCK). Of these image data, the image data of magenta (M), cyan (C) and black (K) are transmitted to the buffer portion 54 and are stored in the buffer portion 54 temporarily. On the other hand, the image data of yellow is in the synthesize portion 53 synthesized with the code data outputted from the code data create portion 52; and, after then, the synthesized data is transmitted to the buffer portion 54 and is temporarily stored in the buffer portion 54.

At the then time, in the code data create portion 52, there are executed the following processings. That is, when the read data is inputted to the output image process portion 51, the first encrypt section 73 encrypts the time information supplied from the time section 71 using the first encrypt key read out from the first encrypt key storage section 72. Next, the first data create section 74 creates the first image data based on the encrypted time information. Also, the second encrypt key create section 75 creates the second encrypt key based on the time information supplied from the time section 71. Then, the second encrypt section 77 encrypts the inherent information read out from the inherent information storage section 76 using the second encrypt key created by the second encrypt key create section 75. And, the second data create section 78 creates the second image data based on the encrypted inherent information. After then, the first image data created in the first data create section 74 and the second image data created in the second data create section 78 are synthesized together in the synthesize output section 79, and the thus synthesized data is output as the code data from the synthesize output section 79. By the way, at the then time, the time information used in the first encrypt section 73 is the same as the time information used in the second encrypt key create section 75.

The image data of the respective colors stored in the buffer portion 54 in this manner are then outputted at a proper timing to their corresponding exposure devices, that is, the exposure device 14Y for Y, exposure device 14M for M, and exposure device 14K for K, respectively.

In the respective image forming units 11 (11Y, 11M, 11C and 11K), the sensitive drums 12 are charged to a given potential by their respective chargers 13. Also, the respective exposure devices 14, according to the image data inputted from the process part 50, allow the corresponding LEDs to emit lights and radiate the lights onto their respective sensitive drums 12. As a result of this, in the respective sensitive drums 12, the charged surfaces thereof are selectively exposed to the lights, whereby electrostatic latent images are formed. The thus formed electrostatic latent images are, in the respective developing devices 15, are developed as the toner images of the respective colors, yellow (Y), magenta (M), cyan (C) and black (K).

The toner images formed on the respective sensitive drums 12 of the respective image forming units 11 are then multi-transferred onto the intermediate transfer belt 21. At the then time, since the image forming unit 11K for black for forming a black toner image is disposed on the most-downstream side in the moving direction of the intermediate transfer belt 21, the black toner image is primarily transferred to the intermediate transfer belt 21 finally. Also, the sensitive drums 12 after such primary transfer are cleaned by their respective drum cleaners 17.

On the other hand, in the sheet deliver system 30, to the timing for the image formation, the take-out roller 32 is rotated and thus sheets of a given size are supplied from the sheet feed tray 31. The sheets, which have been separated from each other by the feed roller 33, reach the resist roller 35 through the delivery passage 34 and are once caused to stop there. After then, the resist roller 35 rotates to the moving timing of the intermediate transfer belt 21 with the toner images formed thereon, whereby the recording sheets are delivered to the secondary transfer position which is formed by the backup roller 24 and secondary transfer roller 36. In the secondary transfer position, to the recording sheets which are delivered upwardly from below, there are transferred the four-color superimposed toner images sequentially in the sub scanning direction using a pressure contact force and a given electric field. And, the recording sheets with the toner images of the respective colors transferred thereto are fixed with heat and pressure by the fixing device 29 and, after then, the recording sheets are discharged by the discharge roller 37 to the discharge tray 38 which is disposed on the upper portion of the main body of the image forming apparatus. On the other hand, the intermediate transfer belt 21 after the secondary transfer is cleaned by the belt cleaner 25 to prepare for the next process.

In this manner, onto the discharge tray 38, there are output the recording sheets, that is, the printed matter in which there are formed the images of the respective visible colors (YMCK) created based on the read data and the yellow (Y) image created based on the code data.

Figure 4:
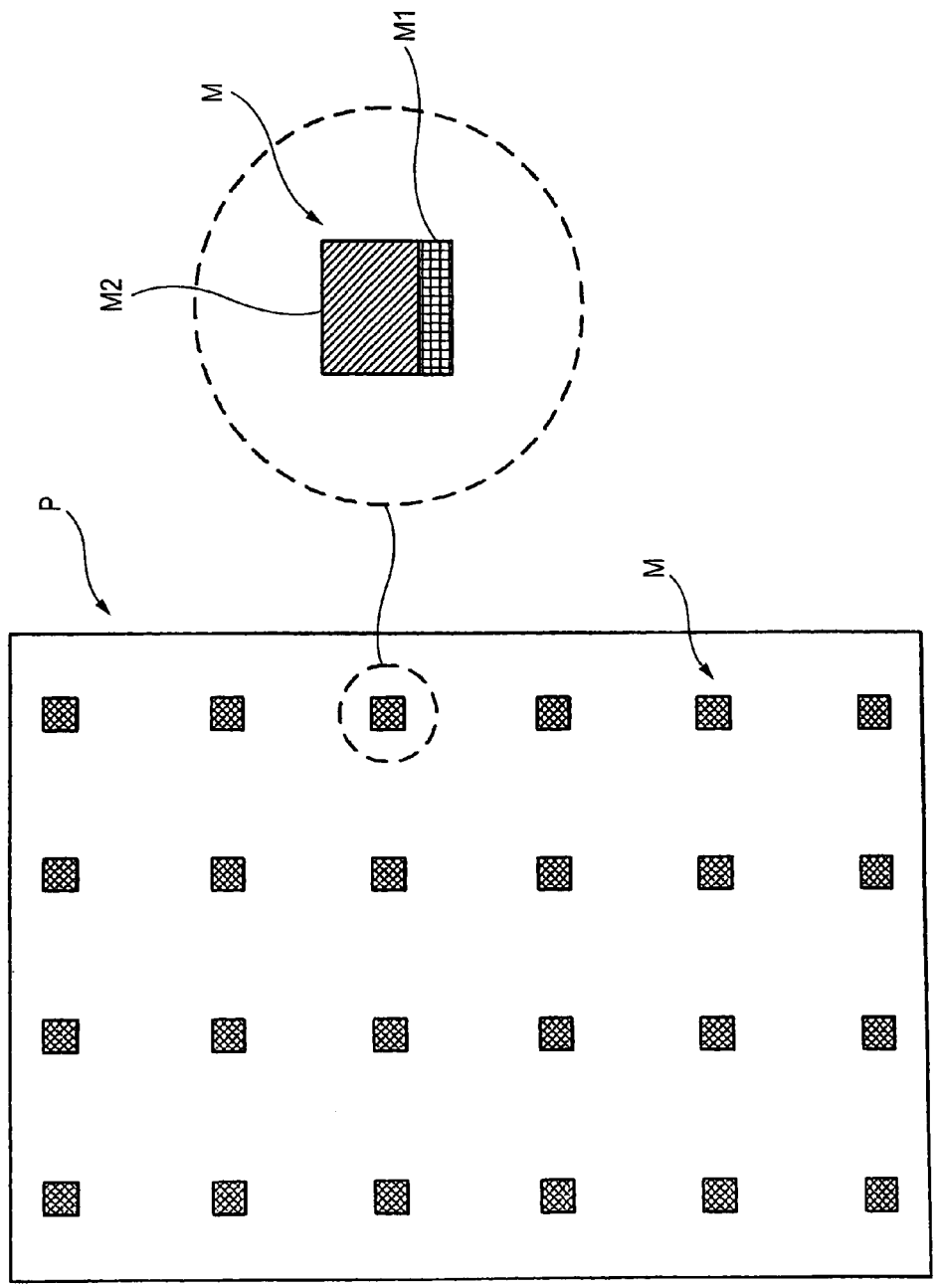
FIG. 4 is a view of a code image formed on printed matter to be outputted.

Here, FIG. 4 shows an example of the printed matter to be outputted. However, in FIG. 4, there are omitted the images of the respective visible colors based on the image data but there is shown only the code image M which is composed of the yellow image created based on the code data.

As regards the code image M, there are formed plural code images M at given intervals on the recording sheet P. Each code image M includes a first mark M1 corresponding to the above-mentioned first image data and a second mark M2 corresponding to the above-mentioned second image data. Here, the first mark M1 contains the encrypted time information, whereas the second mark M2 contains the encrypted inherent information.

By the way, there is a question as to when and where the thus outputted printed matter is outputted. This question occurs, for example, when copying the manuscript used as the original of the printed matter is limited or is prohibited. In the present exemplary embodiment, such question can be answered by reading and analyzing the code image M applied to the printed matter.

Figure 5:
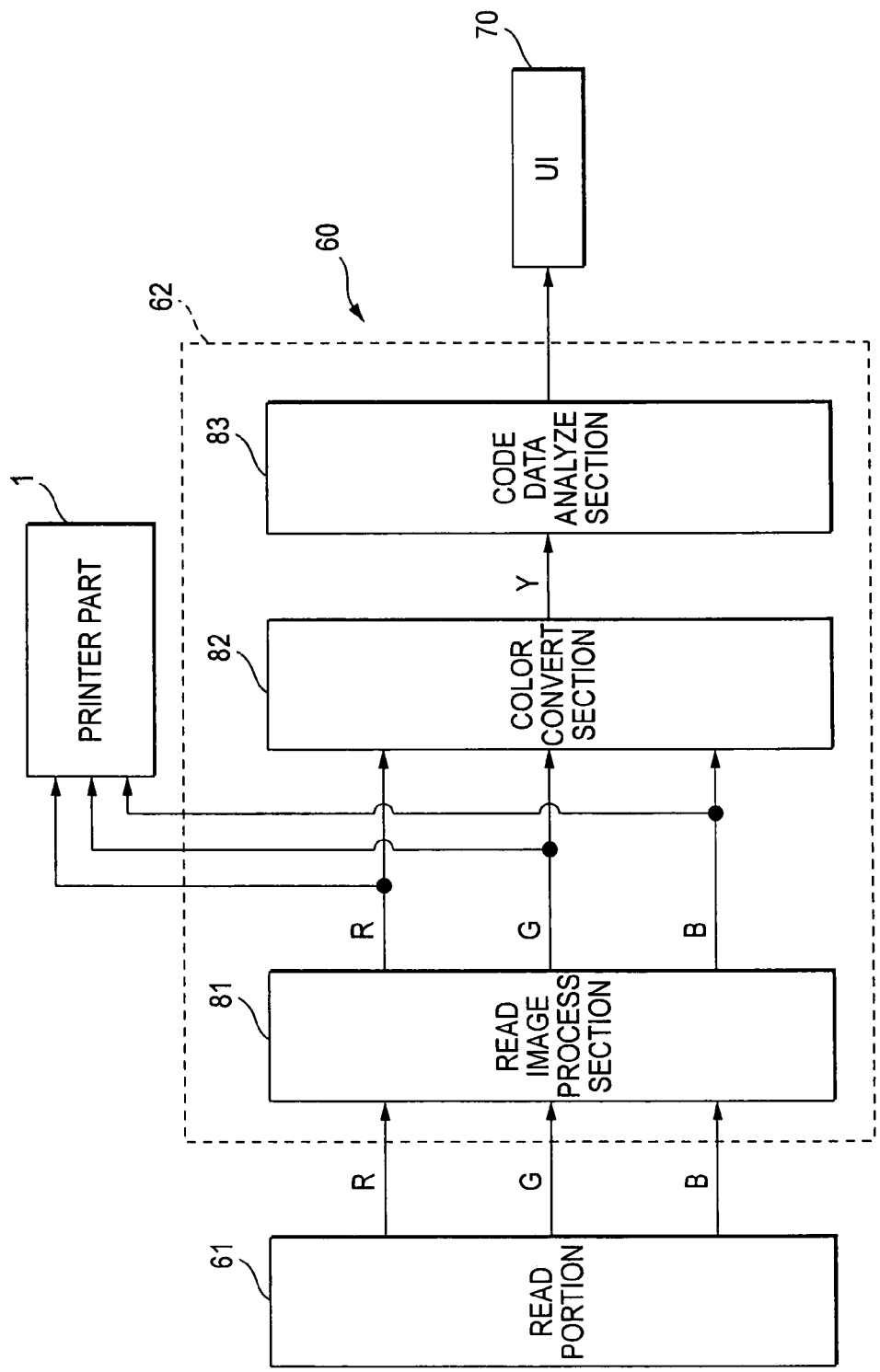
FIG. 5 is a block diagram of the structure of a scanner part.

Now, FIG. 5 is a block diagram of the structure of the scanner part 60 provided in the image forming apparatus. The scanner part 60 includes a read portion 61 and a read process portion 62.

The read portion 61 includes three line sensors which, for example, can respectively read the images of red (R), green (G) and blue (B) formed on the printed matter, and the read portion 61 outputs the red read data, green read data and blue read data.

Also, the read process portion 62 includes a read image process section 81, a color convert section 82 and a code data analyze section 83.

The read image process section 81 enforces a given image processing on the respective color (RGB) read data inputted from the read portion 61. As regards the given image processing, for example, there may be pointed out a shading correction processing or a gradation correction processing. By the way, according to the present exemplary embodiment, the respective color RGB image data with various image processings enforced thereon are outputted to the printer part 1.

The color convert section 82 converts the respective color RGB image data, on which various image processings have been enforced in the read image process section 81, to YMCK image data which are different in color space. By the way, the YMCK image data, on which a color convert processing has been enforced in the color convert section 82, can also be outputted to the printer part 1.

The code data analyze section 83 takes out the code data of the yellow (Y) image data, of the respective color YMCK image data with the color convert processing enforced in the color convert section 82, and analyze the taken-out code data. And, code data analyze section 83 outputs the inherent information of the image forming apparatus obtained by analyzing the code data to the UI 70. The UI 70 displays the inputted inherent information on a display or the like.

Figure 6:
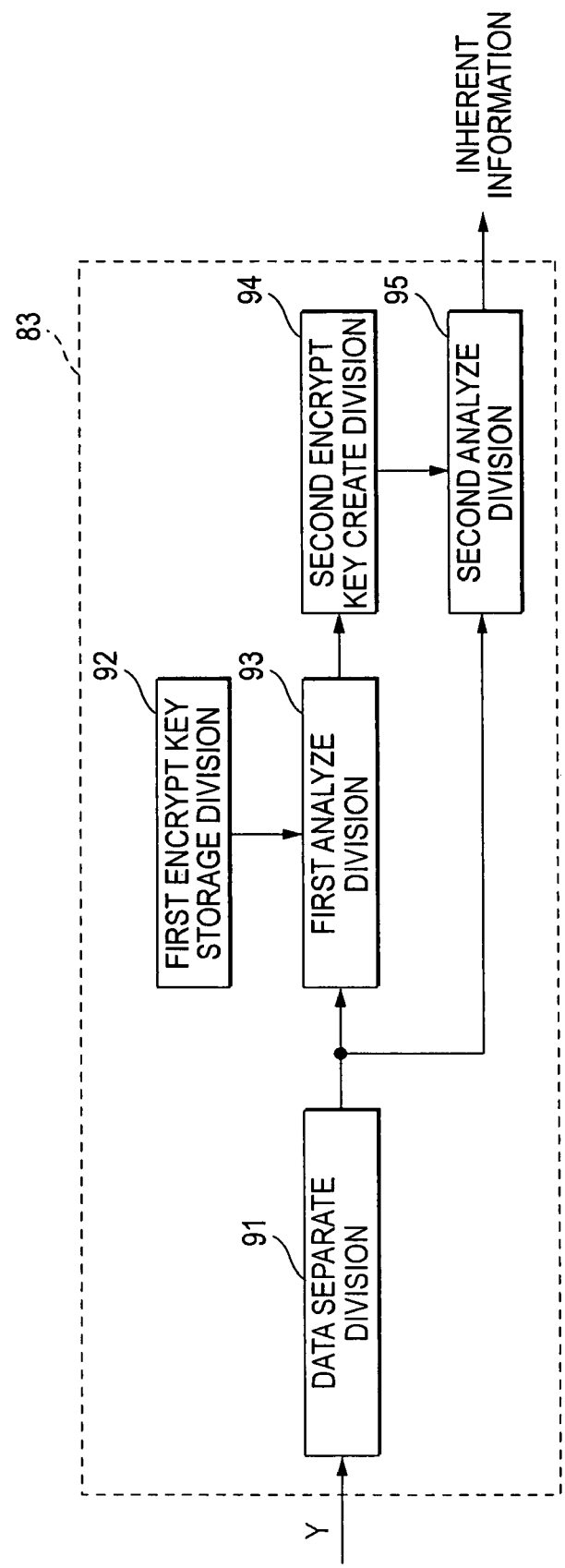
FIG. 6 is a block diagram of a code data analyze section.

Now, FIG. 6 is a block diagram of the code data analyze section 83. The code data analyze section 83 includes a data separate division 91, a first encrypt key storage division 92, a first analyze division 93, a second encrypt key create division 94, and a second analyze division 95.

The data separate division 91 separates the code data contained in the image data of the yellow (Y) inputted therein, that is, the data of the code image M (containing the first and second marks M1 and M2) before it is outputted therefrom.

The first encrypt key storage division 92 stores therein information about the first encrypt key used to decode the time information contained in the code data (specifically, the data of the first mark M1). By the way, in this first encrypt key storage division 92, there is stored the same first encrypt key as that stored in the first encrypt key storage section 72 of the code data create portion 52.

The first analyze division 93 decodes the code data (specifically, the data of the first mark M1) inputted therein using the first encrypt key read out from the first encrypt key storage division 92 to thereby obtain the time information.

The second encrypt key create division 94 functioning as an encrypt key create division, based on the time information outputted from the first analyze division 93, creates a second encrypt key which is used to decode the inherent information contained in the code data (specifically, the data of the second mark M2). Therefore, the second encrypt key create division 94 creates the second encrypt key using the same generating expression as the second encrypt key create section 75 of the code data create portion 52.

The second analyze division 95 decodes the code data inputted therein (specifically, the data of the second mark M2) using the second encrypt key created by the second encrypt key create division 94, and outputs the thus obtained inherent information.

Now, description will be given below of an operation to obtain the inherent information of the printed matter using the scanner part 60.

When the printed matter is read by the read portion 61, the read data of the three RGB colors are inputted to the read process portion 62. In the read process portion 62, after an image processing is enforced on the respective RGB read data in the read image process section 81, a color convert processing is enforced on such data in the color convert section 82 and the thus processed data are then outputted as the YMCK image data. And, the image data are analyzed by the data analyze section 83 using the yellow image data and the thus-obtained inherent information is displayed on the UI 70.

In the code data analyze section 83, after the data separation division 91 separates the code data from the yellow image data, the first analyze division 93 decodes the code data using the first encrypt key, with the result that the time information contained in the code data can be obtained. Next, the second encrypt key create division 94 creates the second encrypt key using the thus obtained time information. Further, the second analyze division 95 decodes the code data using the second encrypt key, with the result that the inherent information contained in the code data can be obtained.

In this manner, there can be obtained various pieces of information (in the present example, information about the department code, installation place and manufacturer's name) of an image forming apparatus (for example, the printer part 1) which has outputted the printed matter.

Here, although, in the present exemplary embodiment, the scanner part 60 cooperating together with the printer part 1 in constituting an image forming apparatus is used to read and analyze the code image M contained in the printed matter, this is not limitative but, for example, it is also possible to use an independent scanner. Also, as regards the reading of the printed matter, it is sufficient to say that only the code image M on the printed matter can be read. Therefore, it is also possible to use other reading means such as a pen-type scanner or a handy scanner, provided that it can read at least a partial area of the printed matter. Further, the analysis of the code data based on the reading of the code image M need not be always made within the scanner part 60 but, for example, a computer device such as a personal computer may be connected to the scanner part 60 and the code data may be analyzed on the side of the computer device.

Exemplary Embodiment 2

Now, the present exemplary embodiment is almost similar to the exemplary embodiment 1 but is different in the following aspect. That is, in the exemplary embodiment 1, the inherent information of the printer part 1 is encrypted using the time information; however, in the present exemplary embodiment, the number of times the power supply of the printer part 1 is put to work is counted and, using such count information, the inherent information of the printer part 1 is encrypted. In the present exemplary embodiment, the same parts as those in the exemplary embodiment 1 are given the same designations and thus the detailed description thereof is omitted here.

Figure 7:
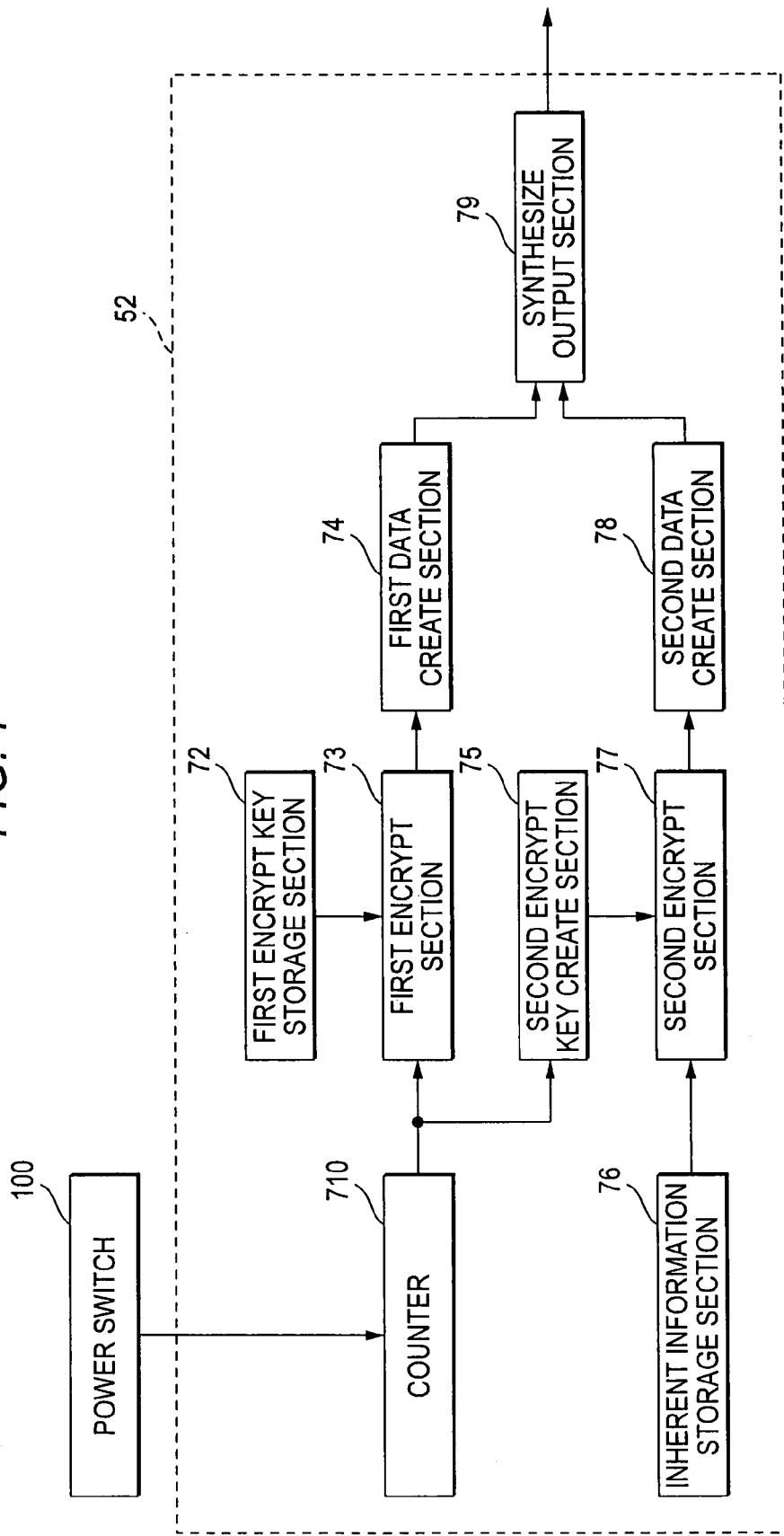
FIG. 7 is a function block diagram of a code data create portion according to the exemplary embodiment 2 of the invention.

Now, FIG. 7 is an explanatory block diagram of the details of a code data create portion 52 employed in the present exemplary embodiment. The code data create portion 52 includes a counter 710, a first encrypt key storage section 72, a first encrypt section 73, a first data create section 74, a second encrypt key create section 75, an inherent information storage section 76, a second encrypt section 77, a second data create section 78, and a synthesize output section 79. By the way, the other remaining sections of the present exemplary embodiment than the counter 710 are the same as the exemplary embodiment 1.

The counter 710 is connected to the power switch 100 of the printer part 1 and is used to count the number of times the power switch 100 is set on. And, the counter 710 outputs the count information (the information about the number of times of on-settings of the power switch 100) to the first encrypt section 73 and second encrypt key create section 75.

Therefore, in the present exemplary embodiment, instead of the time information used in the exemplary embodiment 1, using the count information obtained by the counter 710, the inherent information of the printer part 1 is encrypted. Thus, even when the same inherent information is contained, every time the power switch 100 of the printer part 1 is set on, the contents of the code data outputted, that is, the structures of the code image M vary.

Also, the decoding of the inherent information can be executed using the same technique as in the exemplary embodiment 1 and the inherent information corresponding to the printed matter can be obtained from the reading results of the code image M.

Although, in the present exemplary embodiment, the number of times of on-settings of the power switch 100 is counted and the inherent information is encrypted using the count information, this is not limitative. For example, the number of sheets printed in the printer part 1 may be counted and the inherent information may be encrypted using such sheet count information. In this case as well, since the sheet count information itself is encrypted using the first encrypt key and is converted to code data, the code data can be decoded easily. Further, in the printer part 1, there may be provided a random number generator which generates random numbers and, using the random number information outputted from the random number generator as the first encrypt key, the inherent information may be encrypted.

Exemplary Embodiment 3

Now, the present exemplary embodiment is almost similar to the exemplary embodiment 1 but is different in the following aspect. That is, in the exemplary embodiment 1, the time information and inherent information are encrypted; however, in the present exemplary embodiment, the inherent information is converted to plural pattern data and the thus obtained plural pattern data are rearranged using the time information. In the present exemplary embodiment, the same parts as those in the exemplary embodiment 1 are given the same designations and thus the detailed description thereof is omitted here.

Figure 8:
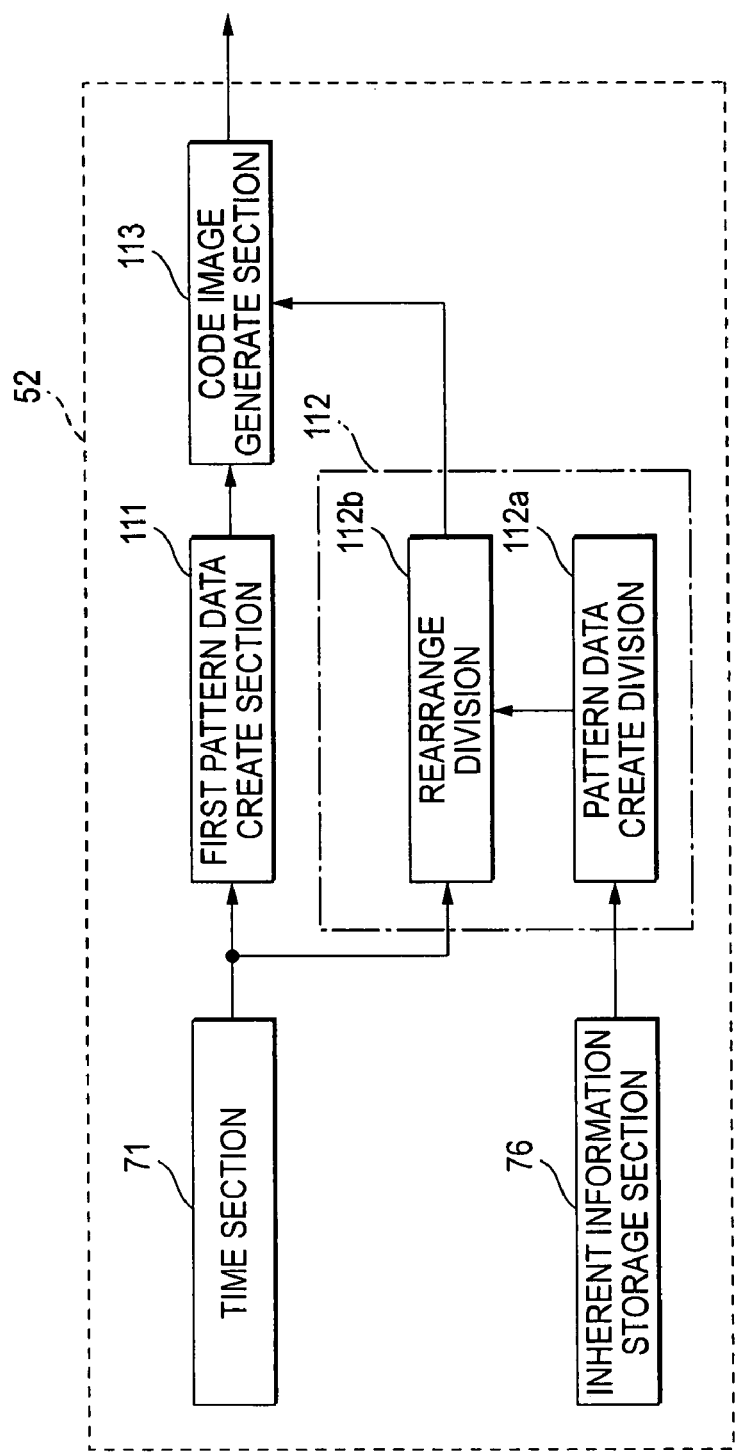
FIG. 8 is a function block diagram of a code data create portion according to the exemplary embodiment 3 of the invention.

Now, FIG. 8 is an explanatory block diagram of the details of a code data create portion 52 employed in the present exemplary embodiment. The code data create portion 52 includes a time section 71, an inherent information storage section 76, a first pattern data create section 111, a second pattern data create section 112, and a code image generate section 113. Here, the second pattern data create section 112 includes a pattern data create division 112a and a rearrange division 112b. The time section 71 and inherent information storage section 76 are the same as in the exemplary embodiment 1.

The first pattern data create section 111 creates pattern data based on the time information supplied from the time section 71.

The pattern data create division 112a of the second pattern data create section 112 creates plural pattern data from the inherent information of the printer part 1 read out from the inherent information storage section 76. And, the rearrange division 112b of the second pattern data create section 112 rearranges the plural pattern data based on the time information supplied from the time portion 71.

The code image generate section 113 generates code data based on the pattern data created by the first pattern data create section 111 and the plural pattern data created and rearranged in the second pattern data create section 112, and then outputs the thus generated code data.

Now, FIG. 9 is an explanatory view of an example of a code data creating operation be carried out in the code data create portion 52.

Here, the forming area of the first mark M1 is composed of 4A~4E blocks, a total of five blocks. To the five blocks that constitute the first mark M1, there are allocated pattern data containing the time information. Specifically, to the areas 4A, 4B, 4C, 4D and 4E, there are allocated year, month, day, hour and minute data, respectively.

On the other hand, the forming area of the second mark M2 is composed of 1A~1E blocks, 2A~2E blocks, and 3A~3E blocks, a total of fifteen blocks. To the fifteen blocks that constitute the second mark M2, there are allocated pattern data D01~D15 each containing the inherent information. Here, the data D01~D05 designate the department code of the printer part 1, the data D06~D10 designate the installation place of the printer part 1, and the data D11~D15 designate the manufacturer's name of the printer part 1, respectively.

For example, when a printout is carried out at 35 min., twelve o'clock midnight, May 31, 2006, the first pattern data create section 111 creates pattern data based on 06 (year), 05 (month), 31 (day), 00 (hour), and 35 (min.), respectively. Next, the pattern data create division 112a of the second pattern data create section 112 creates pattern data based on the inherent information read out from the inherent information storage section 76, that is, the department code, installation place and manufacturer's name, five pieces of pattern data for each of the three items, a total of fifteen pieces of pattern data. And, the rearrange division 112b of the second pattern data create section 112, based on the hour information (what time the printout is to be executed) of the above-mentioned time information, rearranges the fifteen pieces of pattern data.

In this example, since the hour information is 00 (o'clock), the shift amount of the data in the fifteen blocks constituting the second mark M2 is set for 0. That is, as shown in FIG. 9A, in the areas 1A~1E, there are arranged the data D01~D05 which express the department codes; in the areas 2A~2E, there are arranged the data D06~D10 expressing the installation places; and, in the areas 3A~3E, there are arranged the data D11~D15 expressing the manufacturer's names. Therefore, in this case, the code image based on the code data shown in FIG. 9A is generated in and outputted from the code image generate section 113 and, based on this code image, the code image M is formed shown in FIG. 4.

On the other hand, when a printout is carried out an hour later than the above-mentioned time, that is, at 35 min., one o'clock midnight, May 31, 2006, the first pattern data create section 111 creates pattern data based on 06 (year), 05 (month), 31 (day), 01 (hour), and 35 (min.), respectively. Next, the pattern data create division 112a of the second pattern data create section 112, similarly to the above-mentioned case, creates a total of fifteen pieces of pattern data based on the inherent information read out from the inherent information storage section 76. And, the rearrange division 112b of the second pattern data create section 112 rearranges the fifteen pieces of pattern data based on the hour information of the above-mentioned time information.

In this example, since the hour information is 01 (o'clock), the shift amount of the data in the fifteen blocks constituting the second mark M2 is set for 0. That is, as shown in FIG. 9B, in the area 1A, there is arranged the data D15 which expresses the manufacturer's name; in the areas 1B~1E and the area 2A, there are arranged the data D01~D05 respectively expressing the department codes; in the areas 2B~2E and the area 3A, there are arranged the data D06~D010; and, in the areas 3B~3E, there are arranged the remaining data D11~D14.

Therefore, in this case, the code image based on the code data shown in FIG. 9B is generated in and outputted from the code image generate section 113 and, based on this code image, the code image M shown in FIG. 4 is formed.

In this example, in all of the printed matter that is outputted from the printer part 1, there is formed the code image M based on the code data containing the same inherent information. However, in the present exemplary embodiment, since the data in the fifteen blocks constituting the second mark M2 are shifted based on the time information, even when the same inherent information is contained, the patterns (shapes) of the code data vary according to the time when the printout is executed. In this example, the portion of the code data that corresponds to the second mark M can be formed by twelve patterns. And, in this example, although the shift amount is decided according to the hour information of the time information, for example, when the shift amount is decided according to the minute information, the number of patterns in the code data can be increased.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an output part that outputs variable information varying in a time-dependent manner in the image forming apparatus;
   a first encrypt part that encrypts the variable information outputted from the output part using a first encrypt key read out from a memory;
   a second encrypt key create part that creates a second encrypt key according to the variable information outputted from the output part;
   a second encrypt part that encrypts inherent information for specifying the image forming apparatus using the second encrypt key created by the second encrypt key create part;
   a generate part that generates code data according to the variable information encrypted in the first encrypt part and the inherent information encrypted in the second encrypt part; and
   an image form part that forms on a recording member a code image based on the code data generated in the generate part,
   wherein the output part outputs, as the variable information to be encrypted by the first encrypt part and used for the creation of the second encrypt key.

2. An image forming apparatus as set forth in claim 1, further comprising:
   a read part that reads the code image formed on the recording member;
   a first analyze part that analyzes the variable information from the code image read by the read part using the first encrypt key;
   an encrypt key create part that creates the second encrypt key based on the variable information analyzed in the first analyze part; and
   a second analyze part that analyzes the inherent information from the code image read in the read part using the second encrypt key created in the encrypt key create part.

3. An image forming method comprising:
   outputting variable information varying in a time-dependent manner in an image forming apparatus;
   encrypting the output variable information using a first encrypt key read out from a memory;
   creating a second encrypt key according to the output variable information;
   encrypting inherent information for specifying the image forming apparatus using the created second encrypt key;
   generating a code data according to the encrypted variable information and the encrypted inherent information;
   forming on a recording member a code image based on the generated code data,
   wherein the variable information is to be encrypted and used for the creation of the second encrypt key.

4. A non-transitory computer readable medium storing a program causing a computer ton execute a process for generating an image, the process comprising:
   encrypting outputting variable information varying in a time-dependent manner in an image forming apparatus;
   encrypting the output variable information using a first encrypt key read out from a memory;
   creating a second encrypt key according to the output variable information;
   encrypting inherent information for specifying the image forming apparatus using the created second encrypt key;

generating a code data according to the encrypted variable information and the encrypted inherent information;

forming on a recording member a code image based on the generated code data, wherein the variable information is to be encrypted and used for the creation of the second encrypt key.

5. The image forming apparatus according to claim 1, wherein the output part outputs, as the variable information, at least one of time information, information about the number of times of switching on a power of the image forming apparatus, and information about the number of sheets printed by the image forming apparatus.

6. The image forming apparatus according to claim 5, wherein the output part outputs, as the variable information, time information.

7. The image forming apparatus according to claim 1, wherein the inherent information indicates at least one of a department code, an installation place of the image forming apparatus, and a name of manufacturing the image forming apparatus.

* * * * *